United States Patent [19]

Svensson

[11] Patent Number: 5,607,117
[45] Date of Patent: Mar. 4, 1997

[54] FISHING REEL OF THE MULTIPLIER TYPE

[75] Inventor: Patrik Svensson, Karlshamn, Sweden

[73] Assignee: Abu AB, Svängsta, Sweden

[21] Appl. No.: 439,896

[22] Filed: May 12, 1995

[51] Int. Cl.$^6$ .................................................. A01K 89/00
[52] U.S. Cl. ........................................................ 242/261
[58] Field of Search .................................... 242/259, 260, 242/261

[56] References Cited

U.S. PATENT DOCUMENTS

| | | | |
|---|---|---|---|
| 2,162,774 | 6/1939 | Coxe | 242/260 |
| 4,579,296 | 4/1986 | Karlsson et al. | 242/261 |
| 4,747,560 | 5/1988 | Karlsson | 242/260 |
| 4,798,355 | 1/1989 | Kaneko | 242/261 |
| 4,799,628 | 1/1989 | Watanabe et al. | 242/261 X |
| 4,919,360 | 4/1990 | Roberts | 242/260 |
| 5,058,823 | 10/1991 | Emura et al. | 242/261 |
| 5,158,245 | 10/1992 | Johansson | 242/261 |
| 5,333,812 | 8/1994 | Sato | 242/261 |
| 5,489,070 | 2/1996 | Puryear et al. | 242/261 |

FOREIGN PATENT DOCUMENTS 5003742  1/1993  Japan ..................................... 242/259

Primary Examiner—Daniel P. Stodola
Assistant Examiner—William A. Rivera
Attorney, Agent, or Firm—Browdy and Neimark

[57] ABSTRACT

A fishing reel of the multiplier type has a frame, a line spool shaft which is mounted in the frame, and a rotatable line spool which is mounted on the shaft. A clutch member having a gear portion and an engaging portion is mounted on the shaft. The gear portion meshes with a driving gear which is rotatable by a handle. The clutch member is displaceable along the shaft between an engaging position, in which its engaging portion is connected to the line spool for rotation thereof, and a disengaging position, in which the engaging portion is disconnected from the line spool. The clutch member is displaceable back and forth between its engaging position and its disengaging position by a trigger which actuates a clutch mechanism for displacement of the clutch member. The clutch member is also displaceable from the disengaging position to the engaging position by means of the handle which via a returning member, non-rotatably connected thereto, actuates a link arm which is connected to the clutch mechanism and which, when the clutch member is in its disengaging position, is in a position for cooperation with the returning member.

5 Claims, 5 Drawing Sheets

FISHING REEL OF THE MULTIPLIER TYPE

BACKGROUND OF THE INVENTION

The present invention relates to a fishing reel of the multiplier type.

Known fishing reels of this type generally have a frame with two side plates, a line spool shaft extending through the frame, and a rotatable line spool mounted on the line spool shaft. A mounting plate arranged on the frame inwardly of one side plate thereof has a spindle parallel to the line spool shaft and extending through said one side plate, and a center hole through which the line spool shaft extends. A handle is mounted on the spindle outside said one side plate. A driving gear and a toothed wheel are mounted on the spindle and adapted to be rotated by means of the handle. A clutch means is mounted on the line spool shaft in the center hole of the mounting plate and has a gear portion meshing with the driving gear to be rotated thereby. The clutch means is displaceable along the line spool shaft between an engaging position, in which it engages the line spool for rotation thereof, and a disengaging position, in which it is disengaged from the line spool. A clutch mechanism operable by means of a manually adjustable trigger is mounted on the mounting plate for shifting the clutch means between its two positions.

When a cast is to be made, the trigger is actuated for shifting the clutch means to its disengaging position. When the clutch means is in its disengaging position, the line spool can rotate freely. The clutch mechanism is so designed that it will return the clutch means to its engaging position when the angler starts turning the handle in the direction of line retrieve, i.e. the direction in which the part of a line, fixed to the line spool, that has been paid out during the cast is again wound onto the spool.

In some prior-art fishing reels (see e.g. U.S. Pat. Nos. 4,564,158 and 5,158,245), the fishing reel has, in addition to the trigger, a further manually adjustable means. This can be set in two different positions. When it is in one position, the trigger and the clutch mechanism operate as described above. However, when it is in the other position, it acts on the clutch mechanism so as to return the clutch means to its engaging position as soon as the trigger is released. The clutch means can then be returned more quickly than if the return movement is carried out by means of the handle. Such a faster return movement is desirable in a special fishing technique.

In some other prior-art fishing reels, the clutch mechanism is designed such that the clutch means is displaceable not only to its disengaging position, but also to its engaging position by means of a trigger and only by means thereof, which implies that first the trigger must be actuated for shifting the clutch means to its engaging position, before the line spool can be rotated by means of the handle. In this type of fishing reel, the clutch means can also be returned more quickly to its engaging position than if the return movement is carried out by means of the handle.

SUMMARY OF THE INVENTION

The object of the present invention is to provide a fishing reel having a comparatively simple clutch mechanism which is easy to mount and which with respect to function is a combination of the coupling mechanisms of the first mentioned and the last mentioned fishing reel type by the clutch means being displaceable to its disengaging position by means of a trigger and can be returned to its engaging position both by means of the handle and by means of the trigger.

According to the present invention, this object is achieved by means of a fishing reel of the multiplier type comprising a frame;

two outer side plates mounted on said frame;

a line spool shaft mounted in said frame;

a rotatable line spool mounted on said shaft;

a mounting plate arranged in the frame inwardly of one side plate thereof and having a spindle parallel to the line spool shaft and extending through said one side plate, a center hole through which the line spool shaft extends, two first mounting pins substantially diametrically opposed with respect to said center hole, and a second mounting pin, said first and second mounting pins being parallel to the line spool shaft and projecting towards said one side plate;

a handle mounted on said spindle outwardly of said one side plate;

a driving gear and a return means which are mounted on said spindle and adapted to be rotated by means of said handle;

a first toothed segment means having a sleeve portion which is turnably mounted in the center hole of the mounting plate, and a radial flange extending along at least part of the circumference of the sleeve portion and positioned on the side of the mounting plate facing said one side plate and having a ramp means formed thereon and an external toothed segment formed thereon, said first toothed segment means being turnable between a first position and a second position;

a clutch means, which is mounted on said line spool shaft in the sleeve portion of said first toothed segment means and has a gear portion meshing with the driving gear to be rotated thereby, and which is displaceable along the line spool shaft between an engaging position, in which it is connected to the line spool for rotation thereof, and a disengaging position, in which it is disconnected from said line spool;

a yoke having a center portion, in which said clutch means is rotatably mounted, and being displaceably mounted on said two first mounting pins for shifting said clutch means between said two positions;

a first resilient means adapted to press said yoke in such a direction that said clutch means is urged towards its engaging position;

said yoke having a ramp means which is adapted to cooperate with the ramp means on said first toothed segment means so as to, on turning thereof from the first to the second position, displace said yoke in such a direction that said clutch means is moved to its disengaging position;

a second toothed segment means which is turnably mounted on said second mounting pin and has an external toothed segment engaging the toothed segment of said first toothed segment means;

a trigger which is non-rotatably connected to said second toothed segment means for turning thereof between a first position and a second position and, by the engagement of said two toothed segments with each other, for turning said first toothed segment means between its first and its second position;

a second resilient means which is adapted to resiliently retain said second toothed segment means in its first and its second position; and a link arm which is displaceable between a neutral position and an engaging position and which, at one end, has a projection for cooperation with said return means and which, at its other end, is hingedly connected to said second toothed segment means such that, when said second toothed segment means is in its first position, it takes its neutral position and, when said second toothed segment means is in its second position, it takes its engaging position, in which said return means, on rotation of said handle, engages with said projection so as to move said link arm to a position, in which said second toothed segment means is in such an intermediate position that said second resilient means moves said second toothed segment means to its first position.

BRIEF DESCRIPTION OF THE DRAWINGS

The invention will now be described in more detail with reference to the accompanying drawings.

DESCRIPTION OF THE PREFERRED EMBODIMENT

Figure 1:
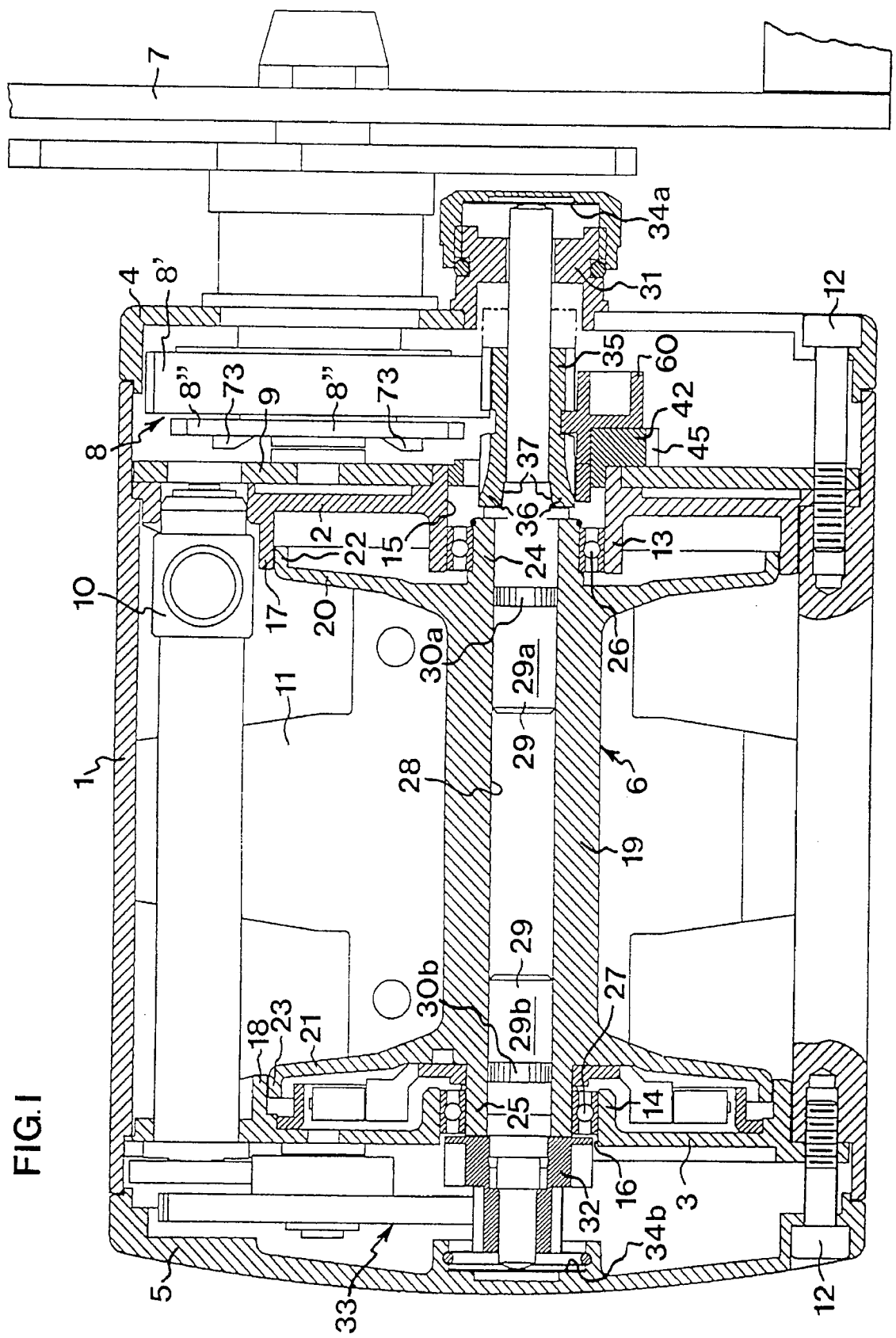
FIG. 1 is a longitudinal section of a fishing reel according to the present invention.
Figure 2:
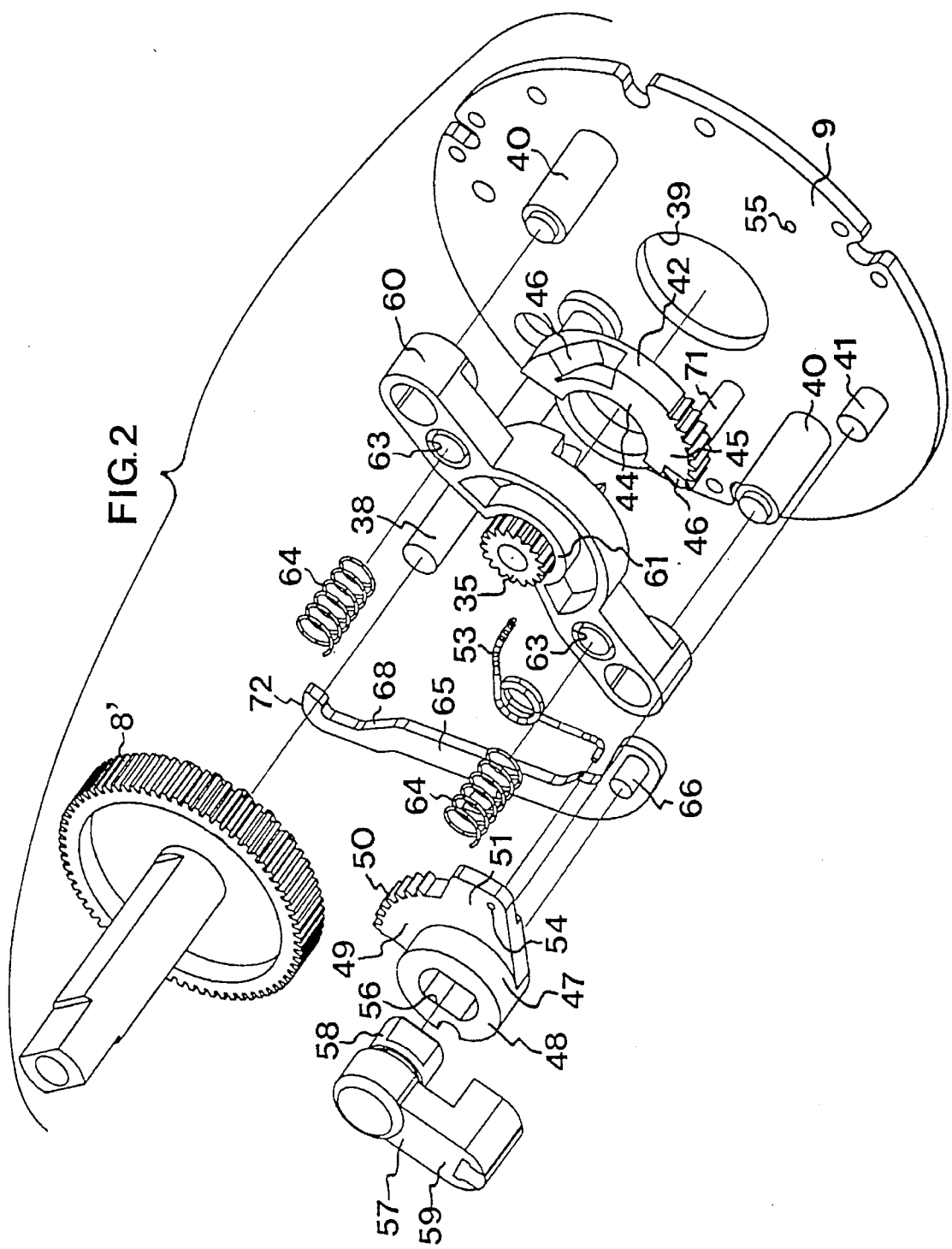
FIG. 2 is an exploded view showing the components of a clutch mechanism in the fishing reel illustrated in FIG. 1.
Figure 3:
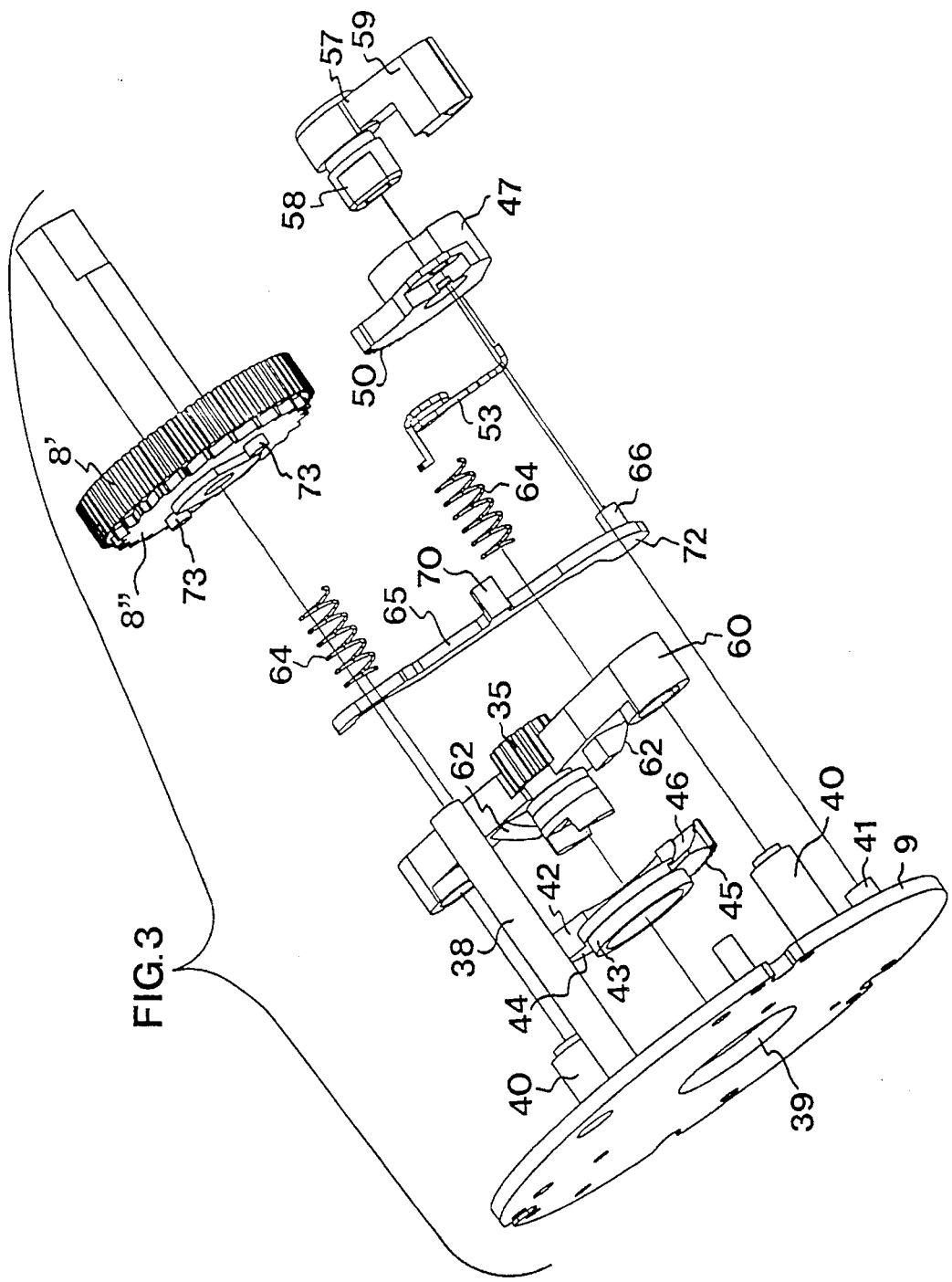
FIG. 3 is a view corresponding to FIG. 2, but illustrates the components in a different perspective.
Figure 4:
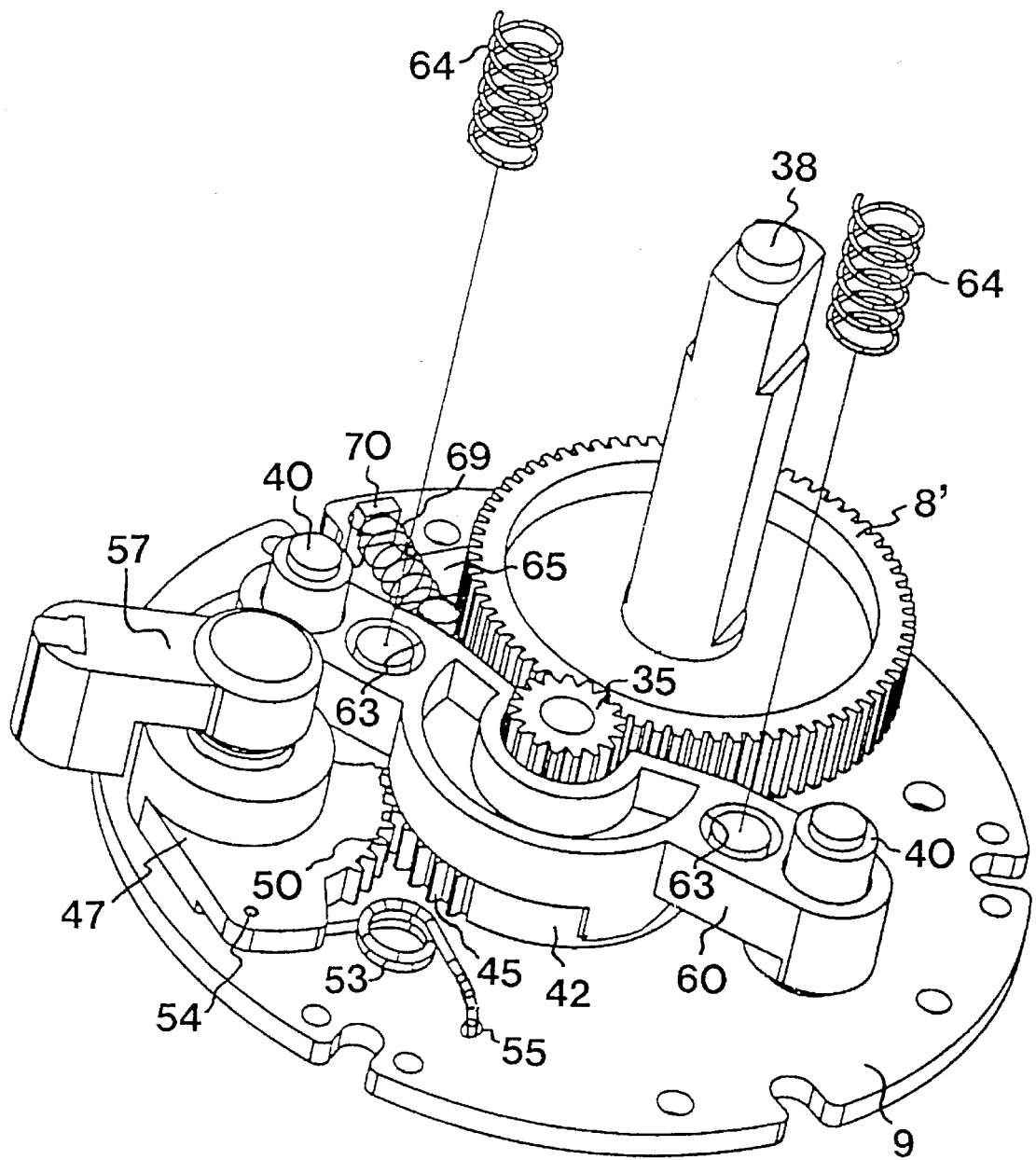
FIG. 4 is a perspective view and shows the clutch mechanism mounted on a mounting plate.

The fishing reel illustrated in FIG. 1 is of the multiplier type and has a substantially circular-cylindrical frame 1, which is of the type shown in Applicant's copending U.S. Patent application entitled "Method for making a frame for fishing reels of the multiplier type", filed on Mar. 31, 1995. Moreover, the fishing reel has two detachable inner side plates 2 and 3, and two detachable outer side plates 4 and 5. The fishing reel also has a line spool 6 for receiving a fishing line (not shown) and mounted in the frame 1 between the two inner side plates 2 and 3, a handle 7 with an associated transmission mechanism 8 for rotation of the line spool 6, a mounting plate 9 fixed to the right-hand inner side plate 2 and carrying the handle 7 and the transmission mechanism 8, a level-wind mechanism 10 mounted in the frame 1 between the two inner side plates 2 and 3, and a foot 11 which is riveted to the frame 1 and by means of which the fishing reel can be mounted on a fishing rod (not shown).

The handle 7 with the associated transmission mechanism 8 and the level-wind mechanism 10 with the associated transmission mechanism 33 (see below) are of conventional type and therefore will not be described in more detail here.

The inner side plates 2 and 3, the outer side plates 4 and 5, as well as the mounting plate 9, all having circular shape, are fixed to the frame 1 by means of screws 12.

Each of the two inner side plates 2 and 3 has a centrally-positioned, axially-directed sleeve means 13 and 14, respectively, defining a central, circular through opening 15 and 16, respectively, in each inner side plate. Each of the two inner side plates 2 and 3 further has a circumferential, axially inwardly directed flange 17 and 18, respectively, coaxial with the central opening 15 and 16, respectively.

The line spool 6 has a cylindrical body 19, which is provided at each end with a circumferential, substantially radial end flange 20, 21. The end flanges 20 and 21 each have an axially outwardly directed circumferential flange 22 and 23, respectively, surrounded by the circumferential flange 17 and 18, respectively, of the inner side plates 2 and 3. At each end, the body 19 of the line spool 6 has an extension coaxial with the line spool and forming a sleeve means 24, 25 axially protruding from the line spool 6. In the illustrated embodiment, the outer diameter of the sleeve means 24 and 25 is considerably smaller than the inner diameter of the sleeve means 13 and 14, respectively. The sleeve means 24 and 25 extend into the sleeve means 13 and 14, respectively, and are rotatably mounted therein by means of ball bearings 26 and 27, respectively. The line spool 6 has an axial center bore 28, which extends through the spool body 19 and the two sleeve means 24 and 25.

In an alternative embodiment (not shown), the outer diameter of the sleeve means 13 and 14 is considerably smaller than the inner diameter of the sleeve means 24 and 25, respectively. In this alternative embodiment, the sleeve means 13 and 14 extend into the sleeve means 24 and 25, respectively, and are rotatably mounted therein by means of intermediate ball bearings.

The shaft 29 of the line spool 6 consists of two shaft members 29a and 29b. The shaft members 29a and 29b each have a circumferential, knurled portion 30a and 30b, respectively, and are inserted with close fit in the center bore 28 of the line spool 6. The line spool 6 thus is non-rotatably connected to the shaft 29. The right shaft member 29a is in a disengageable engagement (described in more detail below) with the transmission mechanism 8 for rotating the line spool 6 when the handle 7 is turned for winding the fishing line onto the line spool 6. The right shaft member 29a extends through the right-hand inner side plate 2 and the mounting plate 9 into the right-hand outer side plate 4, in which it is loosely mounted in a support bearing 31, whose inner diameter is considerably larger than the diameter of the right shaft member 29a in order to make it possible to take up any shaft skewness in the support bearing 31. The left shaft member 29b extends through the left-hand inner side plate 3 and non-rotatably supports outside this side plate a gear unit 32 meshing with a transmission mechanism 33 for driving the level-wind mechanism 10. At their outer ends, the two shaft members 29a and 29b bear on a resilient friction element 34a and 34b, respectively, for adjustable braking of the shaft 29 and hence of the line spool 6.

A gear 35, which forms a clutch means which is operable by means of a clutch mechanism as described in more detail below and is connected to and driven by the handle 7 via the transmission mechanism 8, is mounted on the right shaft member 29a. The gear 35 has at its end facing the line spool 6 two diametrically opposed, axially projecting lugs 36 for engaging with two planar surfaces 37 which are formed on the portion of the right shaft member 29a, that is positioned in the sleeve means 13, said planar surfaces being positioned diametrically opposite one another so as to form a flat. The gear 35 is displaceable along the right shaft member 29a between the engaging position indicated by full lines in FIG. 1, in which the lugs 36 are drivingly engaged with the flat for rotating the line spool 6 when the handle 7 is turned for winding the line, and a disengaging position which is located slightly to the right of the engaging position and indicated by dash-dot lines in FIG. 1 and in which the lugs 36 do not engage with the flat.

The mounting plate 9 has a spindle 38 which is parallel to the shaft 29 and on which the handle 7 and the transmission mechanism 8 are mounted. The transmission mechanism 8 includes a driving gear 8 meshing with the clutch means, i.e. the gear 35, and a toothed wheel 8", the function of which will be described in more detail below. The mounting plate 9 has a center hole 39. A portion of the sleeve means 13 of the right-hand inner side plate 2, that projects towards the right-hand outer side plate 4, extends into the center hole 39 of the mounting plate 9, the diameter of said center hole equalling the outer diameter of this portion of the sleeve means. The mounting plate 9 further has two first mounting pins 40 substantially diametrically opposed with respect to the center hole 39, and a second mounting pin 41. The mounting pins 40 and 41 are parallel to the shaft 29 and project towards the right-hand outer side plate 4.

The clutch means, i.e. the gear 35, is operable by a clutch mechanism supported by the mounting plate 9.

Figure 5:
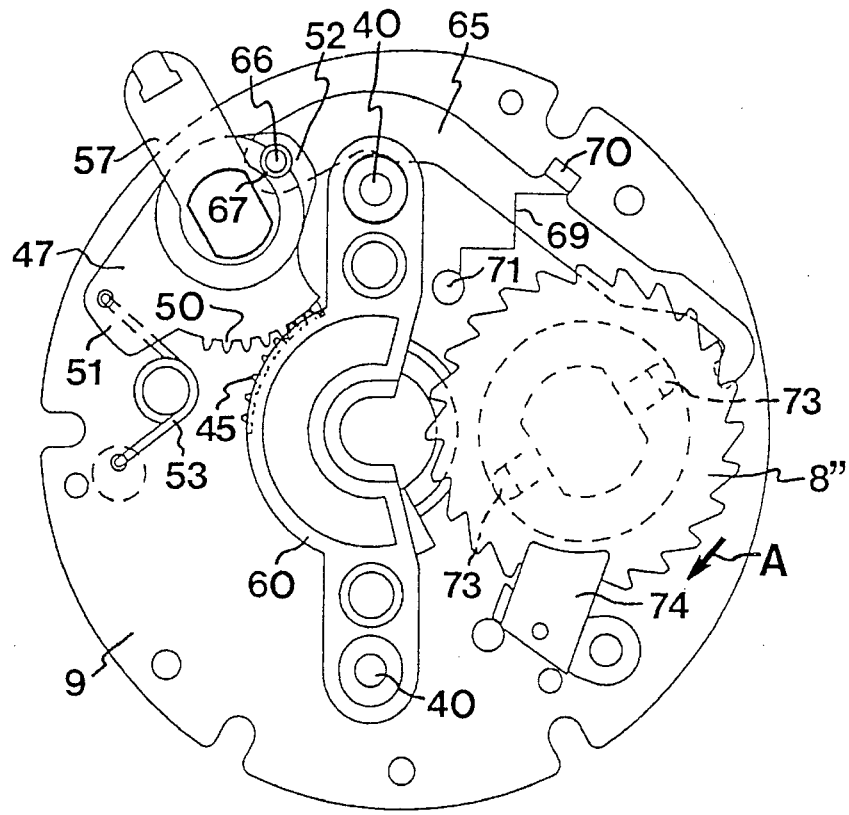
FIGS. 5 and 6 are top plan views and illustrate the clutch mechanism in a first and a second position, respectively.

A first toothed segment means 42 has a sleeve portion 43 by means of which it is turnably mounted in the center hole 39 of the mounting plate 9, or more correctly, in the portion of the sleeve means 13, that is inserted therein. The first toothed segment means 42 is turnable between a first position (FIG. 5), which corresponds to the engaging position of the gear 35, and a second position (FIG. 6) which corresponds to the disengaging position of the gear 35. The first toothed segment means 42 also has a radial flange 44 extending along part of the circumference of the sleeve portion 43 and engaging the side of the mounting plate 9 facing the right-hand outer side plate 4. The flange 44 has an external toothed segment 45 formed thereon. The flange also comprises two diametrically opposed ramp surfaces 46 on its side facing away from the mounting plate 9.

Figure 6:
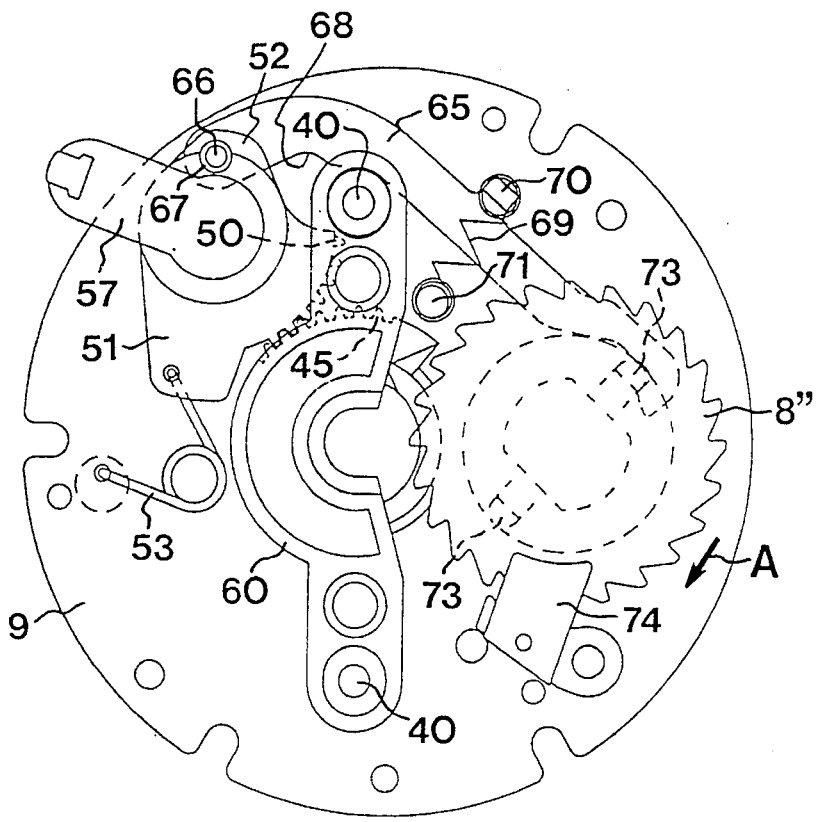

A second toothed segment means 47 has a central portion 48 by means of which it is turnably mounted on the second mounting pin 41. The second toothed segment means 47 is turnable between a first position (FIG. 5) and a second position (FIG. 6). The second toothed segment means 47 also has a radial flange 49 extending along part of the circumference of the central portion 48 and engaging the mounting plate 9. The flange 49 has, formed thereon, an external toothed segment 50 meshing with the toothed segment 45 of the first toothed segment means 42. Two substantially diametrically opposed radial projections 51 and 52 project from the central portion 48 at some distance from the mounting plate 9. A torsion spring 53 having two angular legs engages, by its one leg, into a hole 54 in the projection 51 and, by its other leg, into a hole 55 in the mounting plate 9. The torsion spring 53 resiliently retains the second toothed segment means 47 in the first and the second position thereof.

A recess 56, which is elongate in cross-section, is formed in the second toothed segment means 47 on the side thereof facing away from the mounting plate 9. A trigger 57 has a pin 58 of the same cross-sectional shape as the recess 56 and is inserted therein. Thus, the trigger 57 is non-rotatably connected to the second toothed segment means 47. The trigger 57 also comprises an arm 59 which via a recess (not shown) in the frame 1 projects beyond this so as to be manually operable. The trigger 57 is pivotable between a first position (FIG. 5) and a second position (FIG. 6). When the trigger 57 is pivoted from its first position to its second position, it turns the second toothed segment means 47 from the first position thereof to the second position thereof, also the first toothed segment means 42 being turned, by the engagement of the two toothed segments 45 and 50 with each other, from its first position (FIG. 5) to its second position (FIG. 6). When the trigger 57 is pivoted back to its first position, it correspondingly turns the two toothed segment means 42 and 47 back to their respective first position.

A yoke 60 has a center portion 61, in which the gear 35 is rotatably mounted, and is displaceably mounted on the two first mounting pins 40 for moving the gear 35 along the right shaft member 29a between the engaging position, in which the gear 35 is drivingly engaged with the line spool 6 for rotation thereof, and the disengaging position, in which it is disengaged from the line spool. The yoke 60 has two diametrically opposed ramp surfaces 62 on its side facing the mounting plate 9. The ramp surfaces 62 cooperate with the ramp surfaces 46 of the first toothed segment means 45 in order to move, on turning thereof from the first to the second position, the yoke 60 away from the mounting plate 9 and, thus, move the gear 35 from its engaging position to its disengaging position. The yoke 60 has two diametrically opposed annular grooves 63 on its side facing away from the mounting plate 9. Each annular groove 63 receives a compression spring 64 whose one end rests against the bottom of the annular groove 63 and whose other end rests against the right-hand outer side plate 4. The compression springs 64 thus urge the yoke 60 towards the mounting plate 9. When the first toothed segment means 42 is turned from its second position to its first position, and the ramp surfaces 46 and 62 thus permit this, the compression springs 64 move the yoke 60 towards the mounting plate 9 so as to return the gear 35 to the engaging position.

A link arm 65 extending parallel to the mounting plate 9 has at its one end a pivot pin 66 which extends perpendicular to the mounting plate 9 and which is rotatably received in a hole 67 in the radial projection 52 of the second toothed segment means 47. The link arm 65 is displaceable between a neutral position, in which it is positioned when the second toothed segment means 47 is in its first position, and an engaging position, in which it is positioned when the second toothed segment means 47 is in its second position. The link arm 65 has, formed therefrom, a guide curve 68, which by means of a tension spring 69 is pressed into engagement with one of the two first mounting pins 40, which then functions as a guide pin for the link arm 65. The tension spring 69 is attached between a lug 70 formed on the link arm 65 and a pin 71 projecting from the mounting plate 9. The guide curve 68 has two marked recessed portions which engage the guide pin 40 in the neutral position and the engaging position, respectively. The link arm 65 has, at its other end, an inwardly directed, hook-like projection 72 parallel to the mounting plate 9, for cooperation with the toothed wheel 8". For this cooperation, the toothed wheel 8" has two diametrically opposed lugs 73 extending axially away from the side of the toothed wheel facing the mounting plate 9 a distance inside the circumference of the toothed wheel. When the link arm 65 is in its neutral position, its projection 72 is positioned radially outside the lugs 73 of the toothed wheel 8". When the link arm 65 is in its engaging position, its projection 72 is in such a radial position that, when the toothed wheel 8" is rotated in the winding direction A, it is engaged by one of the lugs 73, which then moves the link arm 65, which turns the second toothed segment means 47 to such an intermediate position that the torsion spring 53 turns it on to its first position. The link arm 65 is then carried by the second toothed segment means 47 to its neutral position. An anti-reverse 74 prevents rotation of the toothed wheel 8" in the direction opposite to the winding direction A.

As is evident from the above, the gear 35 thus is moved to its disengaging position by means of the trigger 57 and is moved to its engaging position either by means of the trigger 57 or by means of the handle 7.

What I claim and desire to secure by Letters Patent is:

1. A fishing reel of the multiplier type, comprising a frame;

two outer side plates mounted on said frame;

a line spool shaft mounted in said frame;

a rotatable line spool mounted on said shaft;

a mounting plate arranged in the frame inwardly of one side plate thereof and having a spindle parallel to the line spool shaft and extending through said one side plate, a center hole through which the line spool shaft extends, two first mounting pins substantially diametrically opposed with respect to said center hole, and a second mounting pin, said first and second mounting pins being parallel to the line spool shaft and projecting towards said one side plate;

a handle mounted on said spindle outwardly of said one side plate;

a driving gear mounted on said spindle and adapted to be rotated by said handle;

a first toothed segment having a sleeve portion which is turnably mounted in the center hole of said mounting plate, and a radial flange extending along at least part of the circumference of the sleeve portion and positioned on the side of the mounting plate facing said one side plate and having a first ramp surface formed thereon and a first external toothed segment formed thereon, said first toothed segment being turnable between a first position and a second position;

a clutch means for engaging and disengaging the line spool mounted on said line spool shaft in the sleeve portion of said first toothed segment which includes a gear portion meshing with the driving gear to be rotated thereby, and which is displaceable along the line spool shaft between an engaging position, in which the clutch means is connected to said line spool for rotation thereof, and a disengaging position, in which the clutch means is disconnected from said line spool;

a yoke having a center portion, in which said clutch means is rotatably mounted, and being displaceably mounted on said two first mounting pins for shifting said clutch means between said engaging position and said disengaging position;

a first resilient means for pressing said yoke in such a direction that said clutch means is urged towards its engaging position;

said yoke including a second ramp surface which is adapted to cooperate with the first ramp surface on said first toothed segment so as to, on turning thereof from the first to the second position, displace said yoke in such a direction that said clutch means is moved to its disengaging position;

a second toothed segment which is turnably mounted on said second mounting pin and has a second external toothed segment engaging the first external toothed segment of said first toothed segment;

a trigger which is non-rotatably connected to said second toothed segment for turning thereof between a first position and a second position and, by the engagement of said first and second toothed segments with each other, for turning said first toothed segment between its first and its second position;

a second resilient means which is adapted to resiliently retain said second toothed segment in its first and its second position; and a link arm having a projection at one end and being hingedly connected at its other end to said second toothed segment, said link arm being displaceable between a neutral position and an engaged position, and return means, mounted on the spindle, for returning said link arm such that, when said second toothed segment is in its first position, the link arm takes its neutral position and, when said second toothed segment is in its second position, the link arm takes its engaged position, in which said return means, on rotation of said handle, engages with said projection so as to move said link arm to a position, in which said second toothed segment is in such an intermediate position that said second resilient means moves said second toothed segment to its first position.

2. Fishing reel as claimed in claim 1, wherein the displacement of said link arm is guided by a guide curve which is formed on said link arm and which is pressed into engagement with a fixed guide pin by means of a third resilient means.

3. Fishing reel as claimed in claim 2, wherein said guide pin is one of the two first mounting pins.

4. Fishing reel as claimed in claim 1, wherein said first ramp surface on said first toothed segment and said second ramp surface on said yoke are diametrically opposed with respect to the center hole of said mounting plate.

5. Fishing reel as claimed in claim 1, wherein said return means consists of at least one lug which is formed on a toothed wheel which cooperates with an anti-reverse for preventing rotation of said handle in one direction.

* * * * *